(12) United States Patent
Chen et al.

(10) Patent No.: US 8,307,430 B1
(45) Date of Patent: Nov. 6, 2012

(54) METHOD AND SYSTEM FOR UDP FLOOD ATTACK DETECTION

(75) Inventors: Hongda Chen, Boyds, MD (US); Lijin Lu, Germantown, MD (US)

(73) Assignee: Riorey, Inc., Bethesda, MD (US)

( * ) Notice: Subject to any disclaimer, the term of this patent is extended or adjusted under 35 U.S.C. 154(b) by 705 days.

(21) Appl. No.: 12/022,729

(22) Filed: Jan. 30, 2008

Related U.S. Application Data

(60) Provisional application No. 60/898,110, filed on Jan. 30, 2007.

(51) Int. Cl.
*G06F 12/14* (2006.01)

(52) U.S. Cl. .............................. 726/22; 726/23; 726/24

(58) Field of Classification Search .................... None
See application file for complete search history.

(56) References Cited

U.S. PATENT DOCUMENTS 7,500,266 B1 * 3/2009 Vukelich et al. ................ 726/23

OTHER PUBLICATIONS

N. Ermolova, "Analysis of Nonlinear Amplifiers with Gaussian Input Signals on the Basis of Complex Gain Measurements," European Transactions on Telecommunications 2004, pp. 501-505.*
N. Ermolova, "Spectral Analysis of Nonlinear Amplifiers based on Complex Gain Taylor Series Expansion," IEEE Communication Letters, vol. 5, No. 12, Dec. 2001, pp. 465-467.*
M. Stoecklin, "Anomaly Detection by Finding Feature Distribution Outliers," ACM 2006, pp. 1-3.*
M. Kalantari and M. Shayman, "Quantifying Responsiveness of TCP Aggregates by Using Direct Sequence Spread Spectrum CDMA and Its Application in Congestion Control", IEEE Globecom, Nov. 2004, pp. 1-8, Dallas, TX.
P. Barford, J. Kline, D. Plonka and A. Ron, "A Signal Analysis of Network Traffic Anomalies", Proceedings of ACM SIGCOMM Workshop on Internet Measurement, 2002, pp. 1-12.
A. Yaar, A. Perrig and D. Song, "Pi: A Path Identification Mechanism to Defend against DDoS Attack", May 11-14, 2003, pp. 1-15, Carnegie Mellon University, Pittsburgh, PA.
C. Cheng, H. Kung, and K. Tan, "Use of Spectral Analysis in Defense Against DoS Attacks", Proceedings of IEEE Globecom, 2002, 6 pages.
Z. Mao, V. Sekar, O. Spatscheck, J. Van Der Merwe, and R. Vasudevan, "Analyzing Large DDoS Attacks Using Multiple Data Sources", Proceedings of SIGCOMM '06 Workshops, Sep. 11-15, 2006, pp. 1-8, Pisa, Italy.
C. Siaterlis and B. Maglaris, "Detecting DDoS Attacks with Passive Measurement Based Heuristics", Proceedings of ISCC'04, 2004, 6 pages.
T. Cover and J. Thomas, "Elements of Information Theory", Wiley Series in Telecommunications, 1991, 36 pages, John Wiley & Sons, Inc., New York, United States.
C. Lin, Errata to "A Comparison of Methods for Multiclass Support Vector Machines", IEEE Transactions on Neural Networks, Jul. 2002, 6 pages, vol. 13, No. 4.

(Continued)

*Primary Examiner* — Kaveh Abrishamkar
(74) *Attorney, Agent, or Firm* — Blank Rome LLP

(57) ABSTRACT

A system and method is provided to identify UDP attacks. A processor determines a spectral density of packet timing intervals, a natural distance between the spectral density and a uniform distribution, and a non-linear amplifier applying a non-linear amplification to the natural distance to detect a denial-of-service attack. It uses the concept of traffic statistics analysis, i.e., spectral densities of arrived-packet timing intervals, calculates the KL-distance measurement and makes decision based on the output of a non-linear Gaussian amplifier, with which one can easily adjust the amplifier via selecting different parameters of mean and variance to satisfy system requirements of false-positive and false-negative UDP attack detections.

7 Claims, 7 Drawing Sheets

The PJSDM detector for UDP attacks.

OTHER PUBLICATIONS

V. Paxon, "Fast Approximate Synthesis of Fractional Gaussian Noise for Generating Self-Similar Network Traffic", Computer Communications Review, Oct. 1997, pp. 5-18, vol. 27(5).

W. Willinger, M. Taqqu, R. Sherman and D. Wilson, "Self-Similarity Through High-Variability: Statistical Analysis of Ethernet LAN Traffic at the Source Level", IEEE/ACM Transactions on Networking, Feb. 1997, pp. 71-86, vol. 5, No. 1.

P. Barford and D. Plonka, "Characteristics of Network Traffic Flow Anomalies", Proceedings of ACM SIGCOMM Internet Measurement Workshop, Nov. 2001, 5 pages, San Francisco, United States.

J. Figueroa-Nazuno, "Book Review: Neural Networks: A Comprehensive Foundation," Computacion y Sistemas, 2000, pp. 191-192, vol. 4, No. 2, Mexico.

* cited by examiner

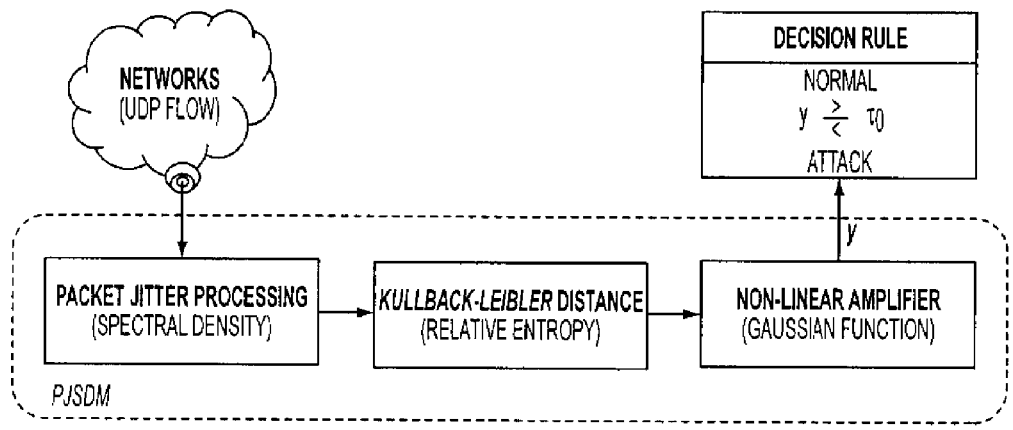
FIG. 1 The PJSDM detector for UDP attacks.
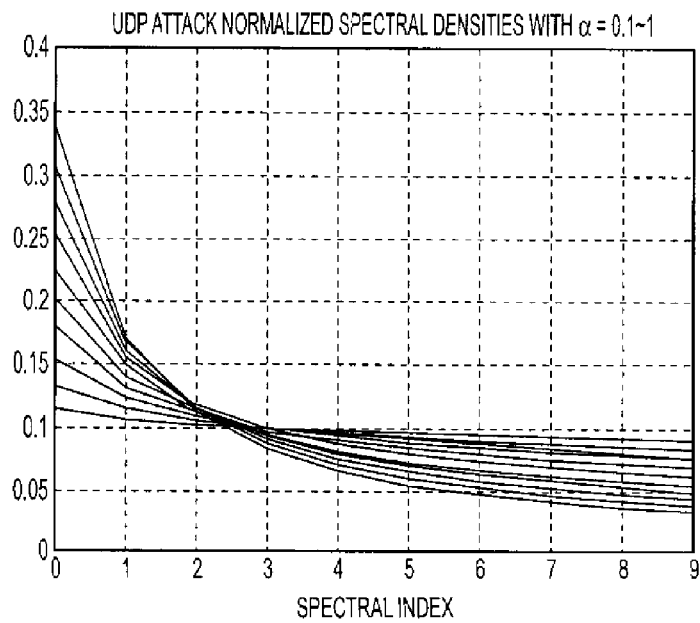
FIG. 2 Normalized 10-point spectral densities with $\alpha = 0.1 \sim 1.0$.

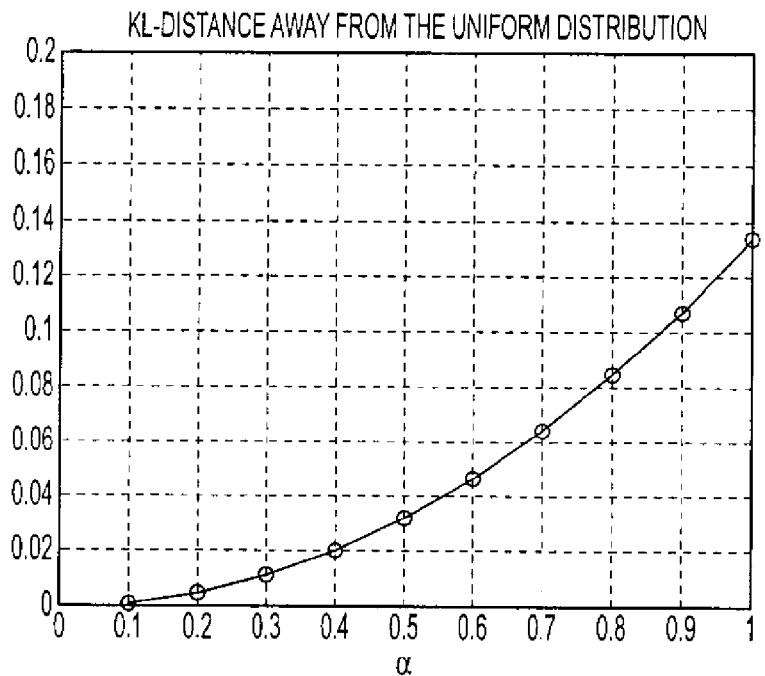
FIG. 3 KL-distance outputs at different α values.
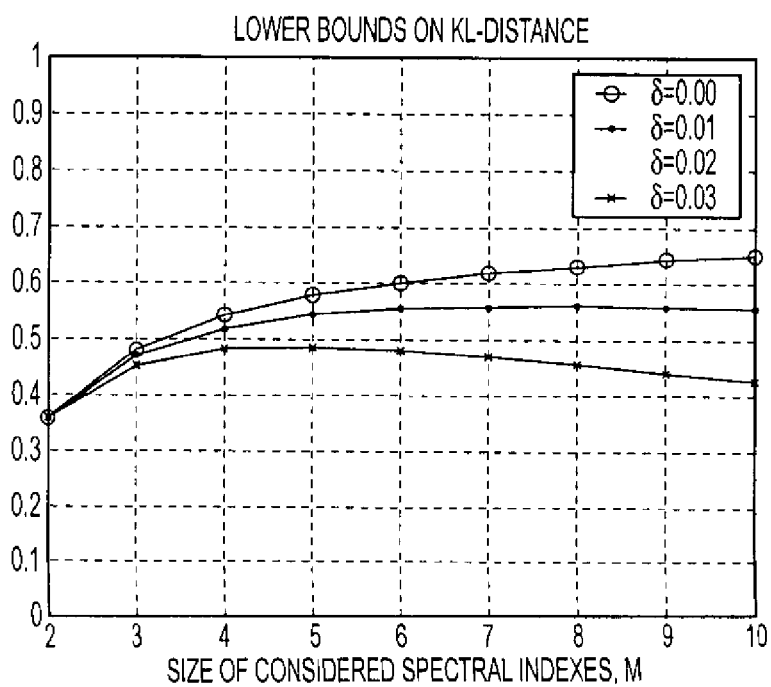
FIG. 4 Lower bounds on KL-distance measurements.

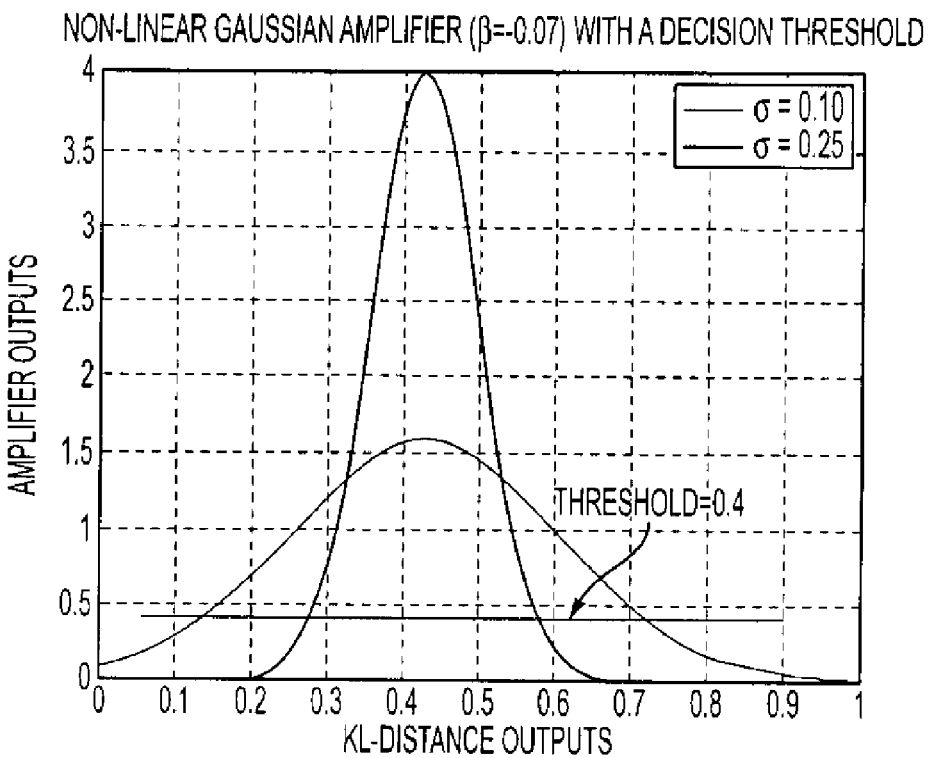
FIG. 5 Examples on non-linear Gaussian amplifiers.
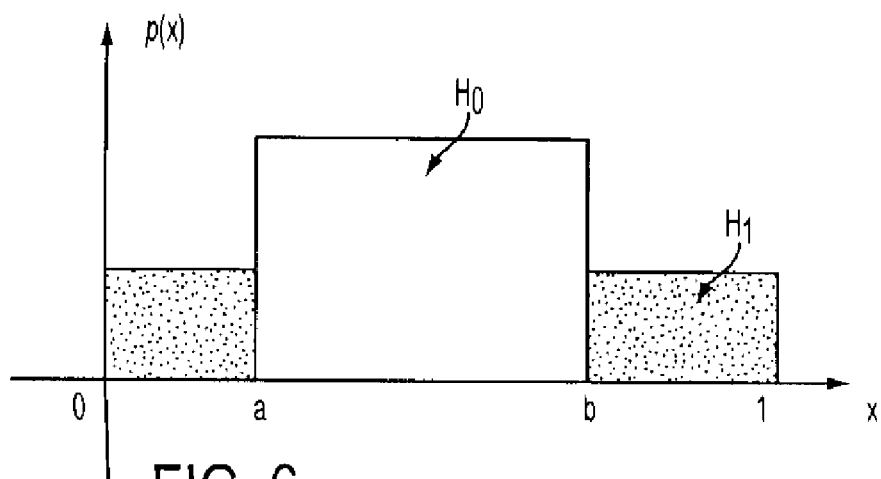
FIG. 6 Illustrating diagram for two hypotheses.

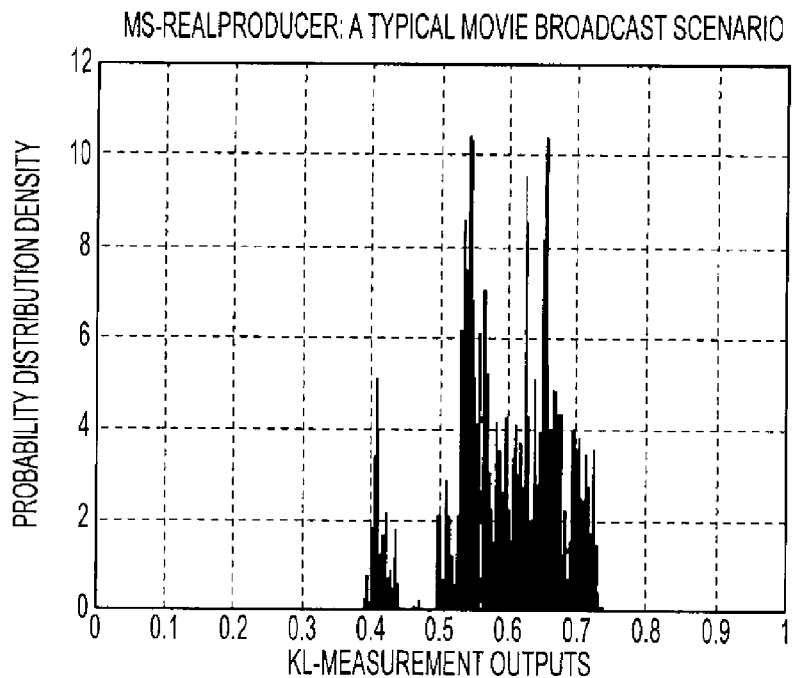
FIG. 7 Real-Producer: probability distribution density of KL-distance measurements.
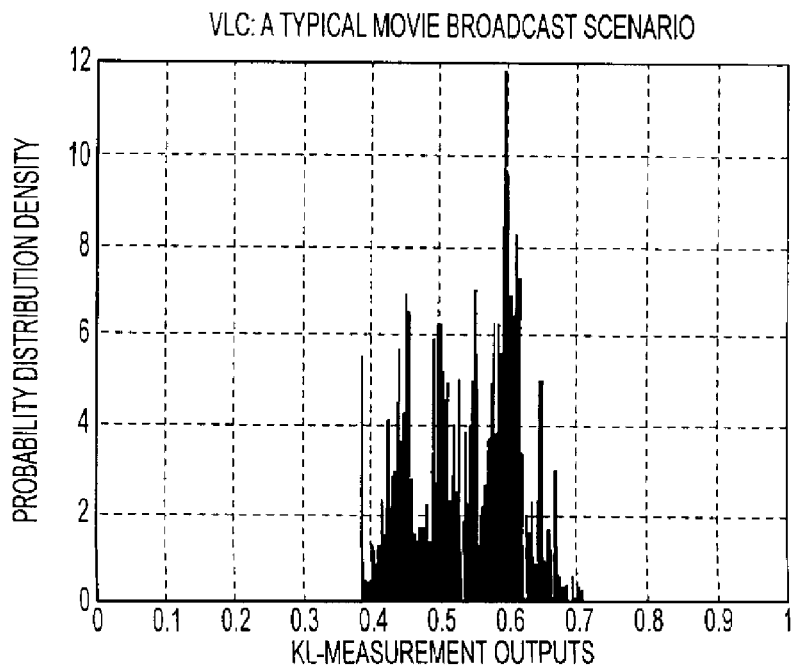
FIG. 8 VLC: probability distribution density of KL-distance measurements.

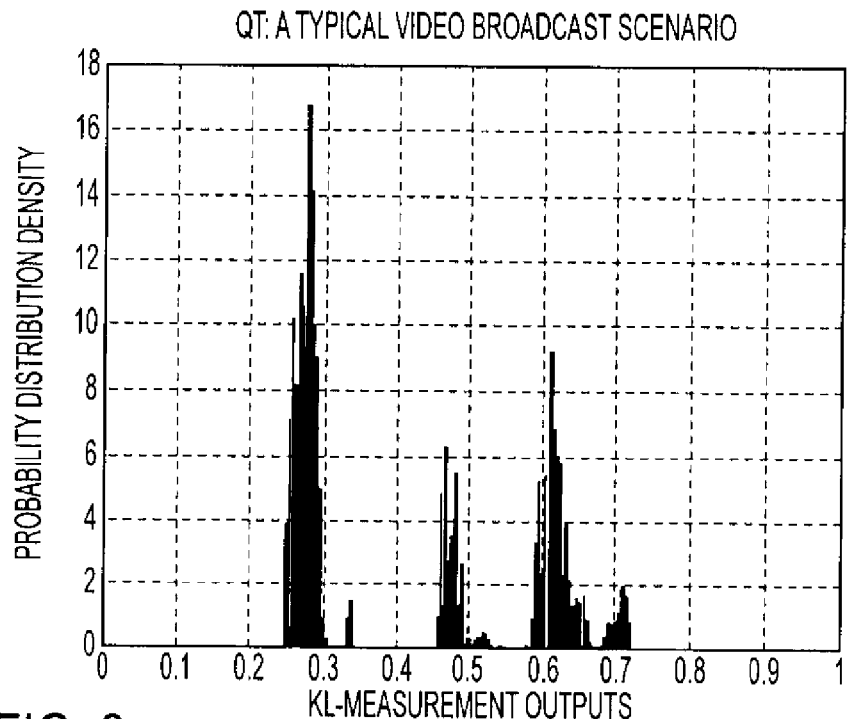
FIG. 9 QT: probability distribution density of KL-distance measurements.
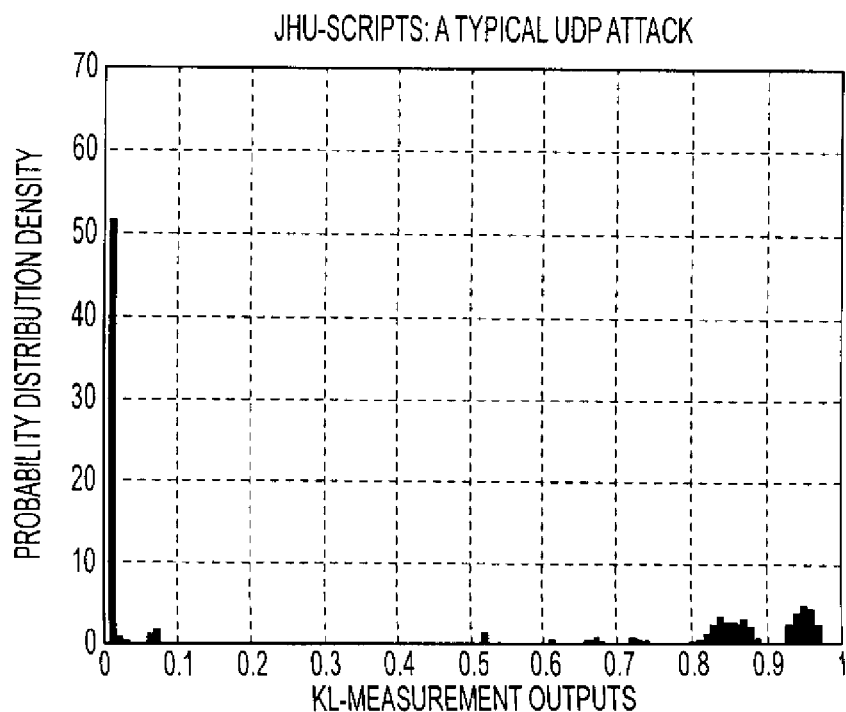
FIG. 10 JHU-script: probability distribution density of KL-distance measurements for UDP attacks.

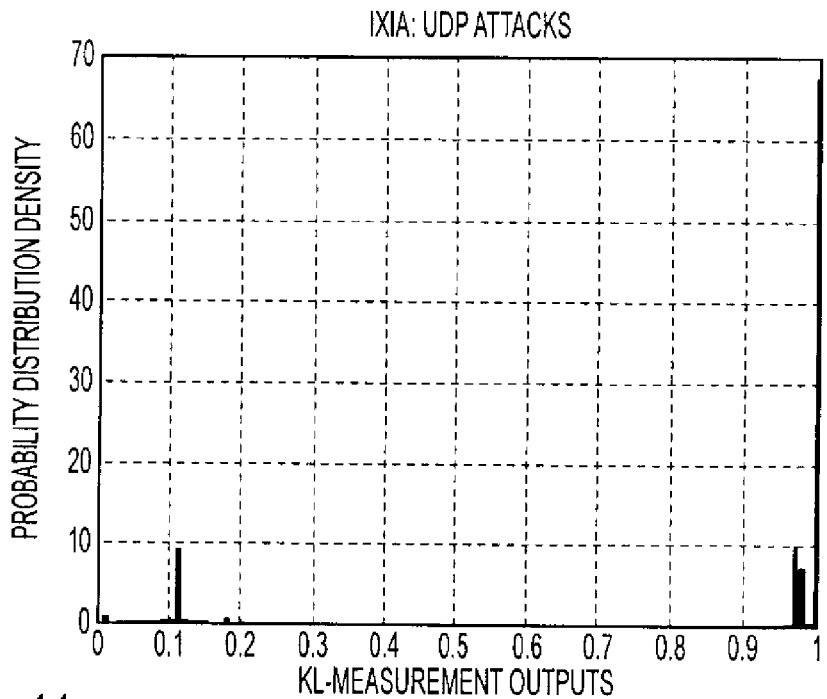
FIG. 11 IXIA: probability distribution density of KL-distance measurements for UDP attacks.
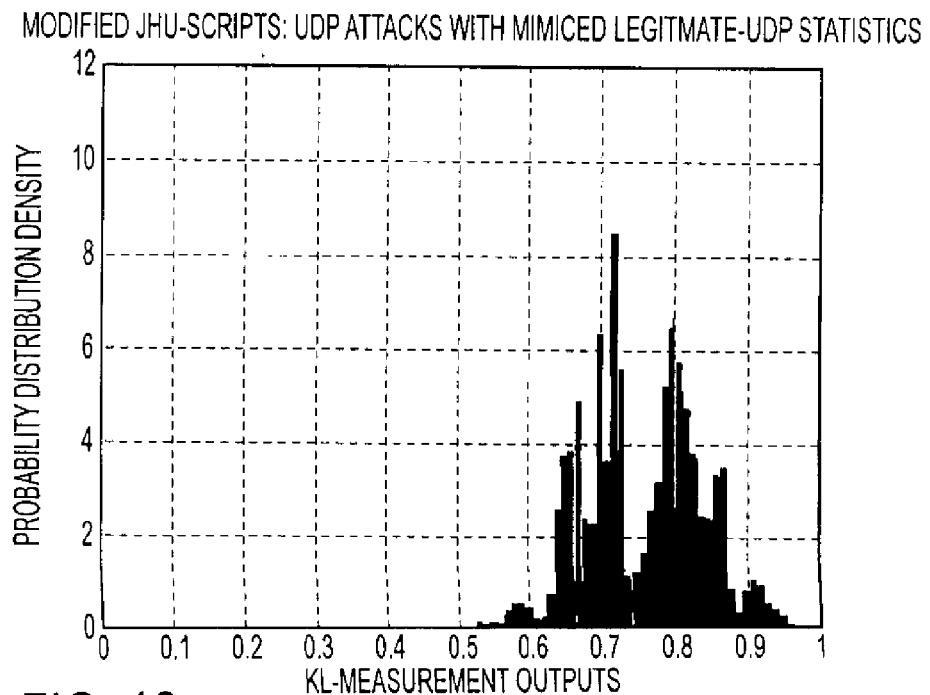
FIG. 12 Modified JHU-script: probability distribution density of KL-distance measurements for UDP attacks.

METHOD AND SYSTEM FOR UDP FLOOD ATTACK DETECTION

This application claims priority to provisional application Ser. No. 60/898,110, filed Jan. 30, 2007, which is hereby incorporated by reference.

BACKGROUND OF THE INVENTION

Distributed denial-of-service (DDoS) attacks have become one of the most serious security threats to the Internet by resulting in massive service disruptions. Most DDoS attacks use either the transmission control protocol (TCP) or the user datagram protocol (UDP) as flooding methods. UDP does not provide the reliability and ordering guarantees that TCP does. Techniques exists to mitigate TCP attacks using hand-shaking characteristics of TCP applications. However, in UDP applications, datagrams may arrive out of order or go missing without notice. Without the overhead of checking if every packet actually arrived, UDP is faster and more efficient for many lightweight or time-sensitive purposes. UDP attacks are thus elusive and reliable detection metrics, which can be implemented with current technology constraints, are rarely mentioned in the research community.

UDP attacks are mainly bandwidth consumption attacks and as this traffic type generally utilizes small amounts of bandwidth, sudden changes in the transferred UDP bytes/sec are generally referred to as indications of attacks. Traditionally, the ratio of incoming/outgoing traffic, the total traffic volume and distribution patterns are common detection metrics. The intuition behind these metrics is that although there isn't a clear symmetry in the UDP traffics as in the case of TCP, there is still a fairly stable site dependent behavior depending on the presence of DNS, NFS and streaming servers etc. However, these metrics generate many false alarms in practice. To help lower the false alarm rate of UDP attack detections, ICMP streams are sometimes considered because most of the times during a UDP attack a reverse ICMP stream is generated. However, the ICMP data might be unavailable if the attacked server is not responding to the attack packets. This can be due to the fact that an attacker attacks a target IP address that is not assigned to any host; the attacked host is down; the Internet access link of the attack target is unavailable; or the attack traffic is filtered.

On the other hand, a network administrator, knowing by experience the network's behavior, can define a clear policy in terms of upper and lower thresholds of what constitutes normal behavior or not with the statistic reports. These thresholds cannot be very tight to avoid a high rate of false positives in practice. Based on the total traffic volume and distribution patterns, a visible ramp-up could be expected during an attack. Unfortunately, this is not always the case, especially in high bandwidth links where the volume of the aggregated attack stream is still a small percent of the total. Moreover, in the case of unidirectional UDP traffics, such as in audio/video broadcasting applications, the ratio metric completely fails to detect UDP flood attacks, and there is not any efficient and effective solution for this particular situation.

SUMMARY OF THE INVENTION

A packet jitter spectral density metric (PJSDM) is provided which deals with UDP attacks by exploring and evaluating large possible defense mechanisms. The PJSDM is a novel UDP flood attack detection method that primarily consists of three techniques: (i) compute the spectral density of packet timing intervals, (ii) calculate the Kullback-Leibler distance (KL-distance) between the spectral density and a uniform distribution, and (iii) go through a non-linear Gaussian amplifier. The invention significantly improves the UDP flood attack detection performance, especially in the case of single directional UDP traffic. In addition, it provides automated analysis of the flow characteristics, and gives network administrators' insight to malicious activities passing through their networks.

The invention provides a technique solution that efficiently and effectively identifies UDP attacks. It outperforms conventional approaches for UDP attack detections in computer networks since the traditional methods cannot satisfy the system performance requirements, especially in unidirectional UDP applications.

One main advantage of this solution is that it uses the concept of traffic statistics analysis, i.e., spectral densities of arrived-packet timing intervals, calculates the KL-distance measurement and makes decision based on the output of a non-linear Gaussian amplifier, with which one can easily adjust the amplifier via selecting different parameters of mean and variance to satisfy system requirements of false-positive and false-negative UDP attack detections.

Power spectral density (PSD) analysis has been used to identify normal TCP flows, where the PSD function of the packet process, defined as the number of packet arrivals for a TCP flow in a constant interval, is the discrete Fourier transform (DFT) of its autocorrelation function. The consequence is due to the fact that TCP flows exhibit periodicity, which means that, if a TCP packet flows through any point in the network, then chances are that after one round-trip time, another packet belonging to the same TCP will flow passing through that same point. However, a UDP flow doesn't have this kind of packet conservation principles. Therefore, this PSD analysis cannot directly apply to UDP flows.

In accordance with the invention, some periodicity information embedded in UDP packet arrival timings is still useful for UDP attack detections. The invention provides two fundamental differences compared with the PSD method. One is that the present invention defines a packet jitter process as the relative timing set of packet arrivals for a UDP flow. The other is that DFT analysis is applied on the process itself instead of its autocorrelation function. By doing these two different processes, it is possible to distinguish UDP flood attacks from normal UDP packets with some additional techniques.

KL-distance is a natural distance function from one probability distribution, to another probability distribution. It is referred to as relative entropy in information theory. There are many applications that use the KL-distance in the field of artificial intelligence, including classifications and pattern recognitions. However, it is never employed in mitigating DDoS applications. The reason is that it is not trivial to clearly show two probability distributions such that the one is due to normal traffic, and the other is due to DDoS attacks in practice. The invention is unique in its utilization of the KL-distance in the application of UDP attack detections. The newly defined spectral density exhibits some statistics similarities as a UDP attack appears.

The Gaussian distribution is well known in statistics. In accordance with the invention, it is noted that the spectral density of general UDP flood attacks is approximately either uniformly distributed or with a high spike at the first index (low frequency area). Hence, the KL-distance measurement is either zero or a very large value. Gaussian non-linearity characteristics, termed as a non-linear Gaussian amplifier, is used to suppress both side values (small/large) and to amplify center values of input signals. By this processing, a simple threshold determines whether or not the monitored networks are under a UDP attack.

This invention of PJSDM utilizes DFT on packet arrival timings, KL-distance measurement, and non-linear Gaussian amplifier, to defend against UDP flood attacks. It provides not only an efficient and effective solution to mitigate the UDP attacks, but also outperforms the existed methods with a configurable performance on false-positive and false-negative UDP attack detections.

The invention can be applied to all the cases of UDP applications in computer networks. The new PJSDM can be implemented in network appliances used to detect TCP attacks, such as the Riorey line of products, NI 1210 and NI 2310, version 2.2 and higher. With this invention, the Riorey products are able to handle TCP and UDP attacks simultaneously.

UDP, a connectionless protocol, runs on top of IP networks so that UDP/IP provides very few error recovery services, offering instead a direct way to send and receive datagrams over an IP network. It is largely employed in IP phone service (voice over IP), and broadcasting messages over a network. The invention mitigates UDP flood attacks and provides super attack detection performance so as to guarantee quality of services in commercial applications.

The invention effectively identifies UDP attacks from uni-directional UDP traffic. Furthermore, this invention provides automated analysis of the flow characteristics, and monitors traffic activities passing through computer networks.

BRIEF DESCRIPTION OF THE FIGURES

FIG. 1 is a block diagram of the PJSDM detector for UDP attacks.

FIG. 2 is a chart showing normalized 10-point spectral densities with $\alpha=0.1\sim1.0$.

FIG. 3 is a chart showing KL-distance outputs at different $\alpha$ values.

FIG. 4 is a chart showing lower bounds on KL-distance measurements.

FIG. 5 is a chart illustrating non-linear Gaussian amplifiers.

FIG. 6 is a chart illustrating two hypotheses.

FIG. 7 is a chart showing probability distribution density of KL-distance measurements.

FIG. 8 is a chart showing probability distribution density of KL-distance measurements.

FIG. 9 is a chart showing probability distribution density of KL-distance measurements.

FIG. 10 is a chart showing probability distribution density of KL-distance measurements for UDP attacks.

FIG. 11 is a chart showing probability distribution density of KL-distance measurements for UDP attacks.

FIG. 12 is a chart showing probability distribution density of KL-distance measurements for UDP attacks.

DETAILED DESCRIPTION OF THE PREFERRED EMBODIMENTS

Figure 13:
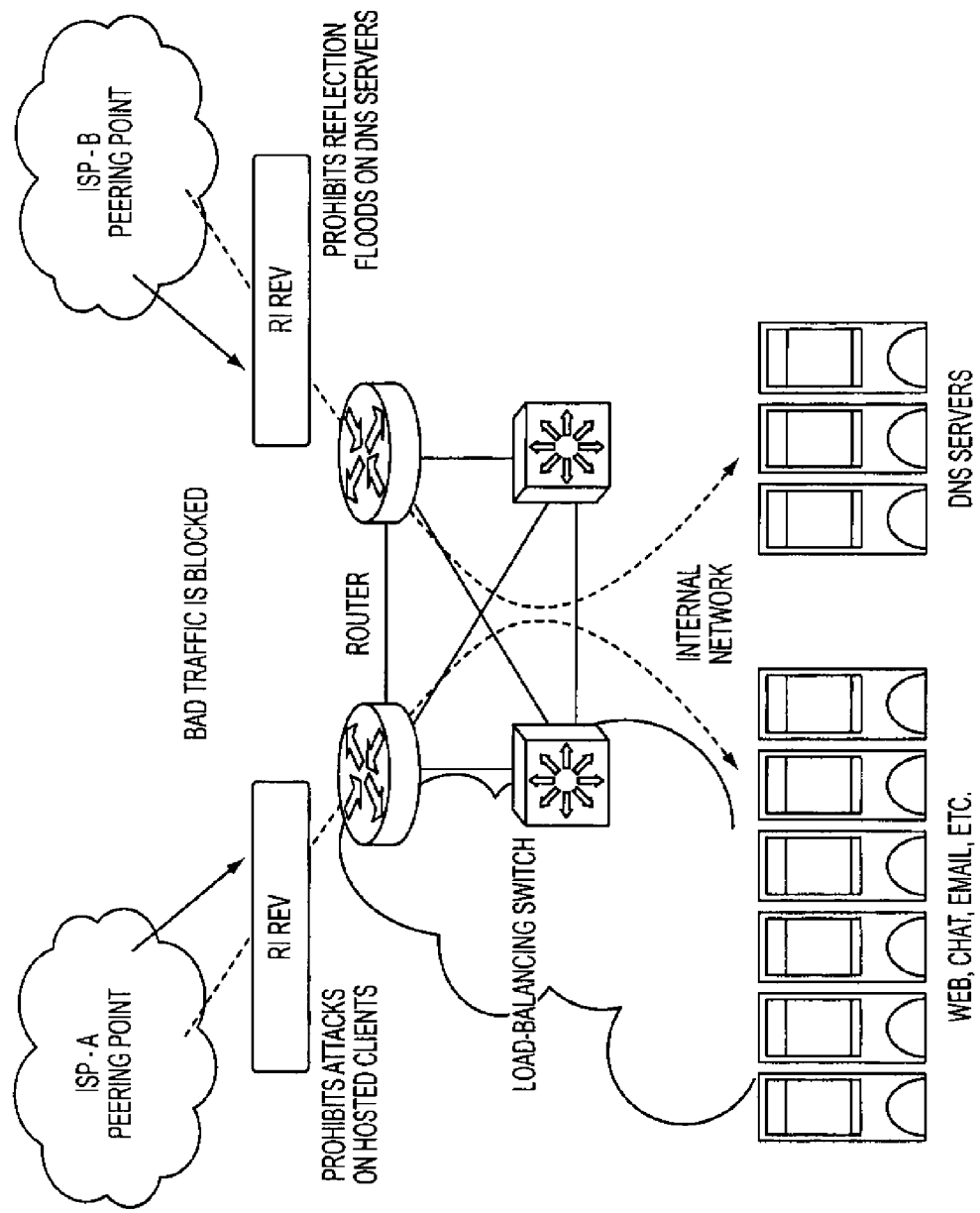
FIG. 13 is a diagram of the communication network of the present invention.

In recent years DDoS attacks have become one of the most serious security threats to the Internet. In a typical DDoS attack, attackers compromise multiple machines and use them to send large numbers of packets to a single victim server to overwhelm its capacity. A general networking approach to mitigate DDoS attacks is to identify and rate-limit attack traffic, preferably at points as close to sources as possible, in order to reduce the collateral damage. However, identifying attack traffic is generally difficult because attackers can manipulate their traffic and packets to defeat detection.

Network traffic has a "self-similar" nature which manifests its presence through a number of equivalent behaviors, namely: (i) autocorrelation function decaying hyperbolically fast (identified as long-range dependence); (ii) spectral density function obeying a power law near the origin, i.e., $S(f)=c \cdot f^{-\alpha}$; $0<\alpha<1$; (iii) variance of the sample mean over limited samples decreasing more slowly than the reciprocal of the sample size. Normal UDP traffic incorporates a heavy tail probability density function (pdf) for the inter-arrival times and a self-similar behavior of the traffic intensity process. Specifically, packet inter-arrival times are described by marginal distributions with heavier tail than that of the exponential. This delicate difference results in distinguishing the traditional UDP attacks from legitimate UDP flows.

Packet jitter spectral density metric (PJSDM) is provided to mitigate the UDP attacks. PJSDM provides an efficient and effective approach based on general properties of network packet traffic, which can be verified by different analysis techniques using, for instance, wavelets and power spectral density analysis. Those studies are identified below as references [5], [6], [12] and [13]. The majority of traffic analysis studies have focused on the typical, packet level and end-to-end behavior (a notable exception being reference [7]). The focus of the present invention is mainly at the flow level, rather than the packet level, and on identifying frequency characteristics of anomalous network traffic. The combined packet arrival stream generated by all sources is considered, rather than focusing on the subset of packets generated by a single source. Because of the highly multiplexed Internet core, such primary performance metrics as packet delays and buffer occupancies should be insensitive to the details of an individual flow.

As illustrated in FIG. 1, the detector of the present invention primarily has three techniques: (i) compute the spectral density of packet timing intervals, (ii) calculate the Kullback-Leibler distance (KL-distance) [1] between the spectral density and a uniform distribution, and (iii) go through a non-linear Gaussian amplifier. The output of the PJSDM is compared with a threshed to make decisions. Thus, the present invention provides a unique solution and significantly improves the UDP flood attack detection performance, especially in the case of single directional UDP traffic. In addition, it provides automated analysis of the flow characteristics, and the outputs of the PJSDM give network administrators' insight to malicious activities passing through their networks as well.

Packet Jitter Process

The invention considers a random process, $\{x(t):x_1, x_2, \ldots, x_N\}$, where N is the number of considered packets and x(t) represents the set of packet inter-arrival times for a UDP flow. For ease of description and without intending to limit the scope of the invention, this random process is generally referred to here as the packet jitter process. To study the periodicity embedded in the packet jitter process, the spectral density is calculated, which is the output of the discrete Fourier transform (DFT) applying on it, which is shown in equation (1).

$$X(k) = \text{Re}\{X(k)\} + j \cdot \text{Im}\{X(k)\}  \quad (1)$$

$$= \sum_{n=1}^{N} x_n \cos\left[2\pi(k-1)\frac{(n-1)}{N}\right] + j\sum_{n=1}^{N} x_n \sin\left[2\pi(k-1)\frac{(n-1)}{N}\right]$$

In equation (1), k denotes the k-th index of the spectral density (k=1, 2, . . . , M), and M is the size of spectrum considerations. In practice, the packet jitter process can be sampled in periodical senses. For example, the invention can obtain a relative timing record every 10 packets. A recursive formula is used to efficiently calculate the DFT, as shown in equation (2)

$$X(k, n+1) = [X(k, n) - x_{n-N} + x_{n+1} \cdot e^{-j2\pi k}] \cdot e^{j\frac{2\pi k}{N}} \quad (2)$$

By using equation (2), the network traffic is monitored on line so that the packet jitter spectral density is efficiently obtained at every time step. As a result, the spectral density of general UDP flood attacks is approximately either uniformly distributed or with a high spike at the first index (low frequency area), which can be observed for instance through the use of computer simulations. Therefore, the invention quantifies UDP flow characteristics changes in terms of the KL-distance between the measured spectral densities and uniformly distributed values.

Kullback-Leibler Distance

KL-distance is a natural distance function from one probability distribution, to another probability distribution. It is referred to as relative entropy in information theory. For discrete probability distributions, $p=\{p_1, \ldots, p_m\}$ and $q=\{q_1, \ldots, q_m\}$, the KL-distance is shown in equation (3).

$$KL(p, q) = \sum_i p_i \log \frac{p_i}{q_i} \quad (3)$$

Applying it to measure the distance of the spectral density away from a uniform distribution, normalization processing is performed on the magnitude of X(k), such as $$p_k = \frac{|X(k)|}{\sum_i |X(i)|} \quad (4)$$

Then, the KL-distance is expressed as:

$$Y = \sum_{k=1}^{M} p_k \log(M p_k) = \log(M) - H(p) \quad (5)$$

Where H(p) denotes the density entropy. Since the first item at the right side of equation (5) is a constant, it shows that the entropy measurement is equivalent to KL-distance in this particular application.

In accordance with the invention, the packet jitter spectral density function of general UDP flood attacks obeys a power law near the origin, i.e., $X(f)=c \cdot f^{-a}$; $0<a<1.0$, and the normal UDP traffic is however approximately with higher $\alpha$. For 10 spectral indexes only, the corresponding packet jitter spectral densities are plotted in FIG. 2. FIG. 3 displays the KL-distance with respective to the parameter $\alpha$.

On the other hand, UDP attacks are very short packet size (say less than 10 bytes) however with huge packet rates. In this case, the packet arrivals appear as a Poisson distribution, see reference [15], and the packet inter-arrival times follow an exponential distribution. Due to lack of periodicity, the packet jitter spectral density exhibits tiny and evenly spread across all frequencies except the first index, i.e., $$[1 \; \underbrace{\delta \ldots \delta}_{M-1}], \delta \ll 1.$$

To extract this extreme case, it is determined how much the KL-distance is affected by this distribution. Particularly, a lower bound of the KL-distance is given by $$KL(p, q) \geq \frac{1}{2 \ln 2} \sum_i (p_i - q_i)^2 \quad (6)$$

In a uniform distribution, it is $\{q_i=1/M, \forall\}$, and the normalized packet jitter spectral density may be expressed by $$p_i = \begin{cases} \frac{1}{1+(M-1)\delta} & i=1 \\ \frac{\delta}{1+(M-1)\delta} & \text{otherwise} \end{cases} \quad (7)$$

Hence the right side of equation (6) can be calculated as $$\frac{1}{2 \ln 2} \sum_i (p_i - q_i)^2 = \frac{1}{2 \ln 2} \left\{ \left[ \frac{1}{1+(M-1)\delta} - \frac{1}{M} \right]^2 + (M-1) \left[ \frac{\delta}{1+(M-1)\delta} - \frac{1}{M} \right]^2 \right\} \quad (8)$$

$$= \frac{(1-\delta)^2(M-1)}{2 \ln 2[1+(M-1)\delta]^2 M}$$

With different values of M and $\delta$, the lower bounds of the KL-distance have been plotted in FIG. 4. Together with FIG. 3, these properties are useful to set up the decision thresholds. As M is to infinite and $\delta \to 0$, then the asymptotical value is 0.7213. Therefore, two thresholds in the KL-distance measurement are set up such that either KL(p,q)>0.7213 or KL(p,q)≦0.1341. These thresholds define UDP attacks, since that of the normal UDP traffic is empirically in the between, i.e., 0.1341<KL(p,q)≦0.7213.

However, in order to provide a robust detector, instead of using the hard decision with two thresholds, the result is passed to a non-linear amplifier so that one threshold may be sufficient to make decisions.

Non-Linear Gaussian Amplifier

The KL-distance measurement is either zero or log M based on equation (5). For normal UDP traffic it is approximately around the median $$\frac{1}{2} \log M.$$

Therefore, we can use a non-linear Gaussian amplifier, i.e., $N(\mu,\sigma^2)$, to suppress both side values (small/large) as to amplify center values of the distance measurements. Technically, the non-linear Gaussian amplifier is just one example. Any one with this property would be selected as the nonlinear amplifier. In the non-linear Gaussian amplifier, we select $$\mu = \frac{1}{2}\log M + \beta.$$

There are two parameters (σ,β), which can be used to adjust the amplifier. The amplified distance measurement is termed as the PJSDM. The PJSDM can efficiently and effectively detect general UDP flood attacks. FIG. 5 illustrates examples using the non-linear Gaussian amplifiers. If selecting the decision threshold equals 0.4, it can be observed that for the case of σ=0.25, the decision is equivalent to the hard decision of 0.1341<KL(p,q)≦0.7213 mentioned previously for normal UDP traffic. By decreasing the parameter σ to 0.10, the good traffic range will be shrunk into [0.27~0.57]. By doing that, it can be expected that the false-positive probability will be increased and the false-negative probability will be decreased. Hence, selecting σ and β, together with the threshold ($\tau_0$), can build the UDP attack detector satisfying system requirements of false-positive and false-negative attack detections in practice.

Due to the fact that manipulated UDP attacks may mimic normal traffic statistics, it is highly possible that the KL-distance measurements of UDP attacks also appear in the range of [0.1341 0.7213]. Hence, the threshold decision may not be effective for all network scenarios. However, the primary problem can be cast as a hypothesis-testing problem, in which it is assumed that there are two possible hypotheses, i.e., $H_0$ and $H_1$, corresponding to two possible states of NORMAL and UNDER-ATTACK. FIG. 6 illustrates this concept by assuming uniform probability distributions. Within the binary hypothesis testing, there are observations of the KL-distance measurements and a decision is made between the NORMAL and UNDER-ATTACK. There are a number of possible decision strategies or rules that could be applied in this model, and the optimal decision rule could be found in some senses. For illustrations, as in the FIG. 6, if an observation belongs to the area between a and b, keep monitoring and no conclusion will be derived; otherwise, the flag of UNDER-ATTACK will be trigged since it is never supposed in the blue areas for good UDP traffic.

Illustrations

The following example is provided to illustrate the invention without intending to limit the scope of the invention. First, unidirectional legitimate UDP and attack data sets are presented. The specific parameters are then selected for the design variables of the PJSDM scheme. Then the results are displayed in real network scenarios.

Audio/video broadcasting is the typical feature for unidirectional UDP applications. Mainly, three software packages may use UDP flows for broadcastings in Internet: (1) Microsoft real producer; (2) VLC media player; and (3) Quick timer (QT) broadcasting. In the present example, a single hosted network with a fast upstream link is monitored. Some information of interest is that this link keeps a sustained rate of 100 Mbps with peaks higher than 300 Mbps and contains a rich network traffic mix carrying both standard network services like web traffic, peer-to-peer application traffic, as well as streaming audio and video traffic. One Windows PC (IPB) was located inside a company LAN network with 10 Mbps link whereas the Linux PC (IPA) was outside the LAN coming directly from its ISP. It is treated as a legitimate user when IPA broadcasts normal UDP packets, and as an attacker if the IPA performs UDP attacks. A popular network protocol analyzer, Wireshark, can be used to dump traffic.

Large different scenarios using the three considered software packages can be utilized to identify that the KL-distance measurements for this illustration are in the range of [0.2 0.8] with probability one, including audio/video signals such as mp3 music, movies and etc. As examples, FIGS. 7-9 display the probability distribution densities of KL-distance measurements in typical movie broadcast scenarios with the three tools respectively.

On the other hand, the UDP attacks can be simulated by two typical UDP flood tools: (1) JHU-scripts (generated from John Hopkins University); and (2) IXIA UDP attacks. The first one is simply a Linux script with a non-exit loop to keep sending UDP packets to an IP address with fixed/random port number and data contains. The second one is from an IP performance testing equipment, reference [20], which can generate most IP traffic with different parameter settings. FIG. 10 shows the probability distribution density of KL-distance measurements using the JHU-script. There are about 5% probabilities in the range of [0.1341 0.7213], and more than 55% probabilities under 0.1341. FIG. 11 presents the probability distribution density of KL-distance measurements using the IXIA generator with all possible parameter settings of fixed-length 64 bytes, uniform distribution 64-1518 bytes, increment 1-1518 bytes and auto-length. There are over 85% probabilities larger than 0.7213, and less than 1% probabilities under 0.1341.

Moreover, the JHU-script is modified by introducing random timing delays and random packet lengths, so as to mimic the normal UDP traffic. As plotted in FIG. 12, the probability distribution density of KL-distance measurements will occur at the normal range of [0.1341 0.7213] with about 50% probabilities.

Based on the statistics of legitimate and attack UDP flows, a binary hypotheses testing model will be needed. As illustrated in FIG. 6 and considering 0.05 allowance, the specific parameters that are chosen for the design variables of this PJSDM scheme are thresholds of a=0.1341, b=0.7713. Within the binary hypothesis testing, there are observations of the KL-distance measurements and a decision is made between the NORMAL and UNDER-ATTACK. If a KL-distance measurement belongs to the range of [0.1341 0.7713], keep monitoring and no conclusion will be derived; otherwise, the flag of UNDER-ATTACK will be trigged since it is never supposed in the blue areas for good UDP traffic. With the help of computer simulations and practical implementations, the performance is evaluated and applied to real network scenarios. The correct detection probabilities of UDP attacks are higher than 98% and false negative probabilities are less than 2%.

Accordingly, a novel UDP flood detector is provided, termed as PJSDM, which consists of three techniques of computing the spectral density of packet timing intervals, calculating the KL-distance between the spectral density and a uniform distribution, and going through a non-linear Gaussian amplifier. In comparison with traditional approaches, this invention provides a unique solution and significantly improves the performance of UDP flood attack detection, especially in the case of single directional UDP traffic. The binary hypotheses testing model is used for robust detections.

Referring to FIG. 13, a communication network is shown having ISP peering points, routers, switches and various servers. The routers, switches and servers include processors and software to perform its operations. In addition, the detector of the present invention is shown located between the peering points and the routers to block attack traffic. The detectors include a processor or controller and software that operates the processor to perform the operation of the detection in accordance with the invention. The detectors may also have memory and other elements to facilitate operation, as well as user input devices to allow user control.

The detectors are preferably deployed in-line at the perimeter of the network as a border defense against attacks. Located at the edge of the network, this first line of defense keeps attack traffic out of the hosting data center network. When deployed in this fashion, the detectors automatically identify and block DDOS attack traffic. Network personnel can monitor our actions and results but they do not need to take any actions to identify or block a DDOS attack. In addition, the system produces zero false positives so that it does not block valid customer traffic. It also does not require a blacklist to operate. Therefore, a user's customer can still communicate with the user even when the detector is blocking attack traffic from the same computer.

By sitting on the perimeter of the network, attack traffic is blocked from entering any part of the user's network that sits behind the detector. Thus, the detector removes the DDOS attack traffic before it enters the network so that existing network defenses can operate. By eliminating the flood of attack traffic, defense resources can fully focus on intercepting invasive probes that are often imbedded in, or which immediately follow, a DDOS attack.

The following documents are incorporated herein by reference.

[1] M. Kalantari and M. Shayman, "Quantifying Responsiveness of TCP Aggregates by Using Direct Sequence Spread Spectrum CDMA and Its Application in Congestion Control", *IEEE Globecom*, Dallas, Tex., November 2004.
[2] P. Barford, J. Kline, D. Plonka and A. Ron, "A Signal Analysis of Network Traffic Anomalies", *Proceedings of the 2nd ACM SIGCOMM Workshop on Internet Measurement*, pp. 71-82, 2002.
[3] A. Yaar, A. Perrig and D. Song, "Pi: A Path Identification Mechanism to Defend against DDoS Attacks", Carnegie Mellon University.
[4] CISCO Netflow. http://www.cisco.com/go/netflow.
[5] C. Cheng, H. Kung and K. Tan, "Use of Spectral Analysis in Defense against DoS Attacks", *Proceedings of IEEE GLOBECOM* 2002.
[6] Z. Mao, V. Sekar, and O. Spatscheck, "Analyzing Large DDoS Attacks Using Multiple Data Sources", *Proceedings of SIGCOMM '06 Workshops*, Sep. 11-15, 2006, Pisa, Italy.
[7] C. Siaterlis and B. Maglaris, "Detecting DDoS Attacks with Passive Measurement Based Heuristics", *Proceedings of ISCC '04*, pp. 339-344, 2004.
[8] M. Kalantari and M. Shayman, "Quantifying Responsiveness of TCP Aggregates by Using Direct Sequence Spread Spectrum CDMA and Its Application in Congestion Control," *IEEE Globecom*, Dallas, Tex., November 2004.
[9] T. Cover and J. Thomas, "Elements of Information Theory", Wiley Series in Telecommunications, ISBN 0-471-06259-6, 1991.
[10] S. Haykin, Neural Networks: A Comprehensive Foundation, IEEE Press, 1996.
[11] C.-W. Hsu, and C.-J. Lin, *A Comparison of Methods for Multiclass Support Vector Machines*. IEEE Transaction on Neural Networks, 2002. 13(2): p. 415-425.
[12] V. Paxon, "Fast, approximate synthesis of fractional Gaussian noise for generating self-similar network traffic", *Computer Communications Re-view*, vol. 27(5), pp. 5-18, October 1997.
[13] W. Willinger, M. Taqqu, R. Sherman, and D. Wilson, "Self-similarity through high-variability: Statistical analysis of Ethernet LAN traffic at the source level", *IEEE/ACM Transactions on Networking*, vol. 5, no. 1, pp. 71.-86, February 1997.
[14] P. Barford and D. Plonka, "Characteristics of network traffic flow anomalies", in *Proceedings of ACM SIGCOMM Internet Measurement Workshop*, San Francisco, Calif., November 2001.
[15] M. Nabe, K. Baba, M. Murata and H. Miyahara, "Analysis and modeling of WWW traffic for designing Internet access networks", The Transactions of IEICE, B, vol. J80-B-I, pp. 428-437, 1997.
[16] H. Vincent Poor, An Introduction to Signal Detection and Estimation, ISBN 3-540-96667-6, Springer-Verlag Berlin Heidelberg New York, 1988.
[17] http://www.realnetworks.com/products/producer/index.html
[18] http://www.videolan.org/vlc/
[19] http://www.apple.com/quicktime/broadcaster/
[20] http://www.ixiacom.com/
[21] http://www.wireshark.org/

The invention claimed is:

1. A method for detecting distributed denial-of-service attacks, the method comprising:
determining a spectral density of packet timing intervals using a computer processor,
determining, using the computer processor, a natural distance between the spectral density and a uniform distribution, and
detecting, using the computer processor, a denial-of-service attack based on a non-linear amplification of the natural distance.

2. The method of claim 1, wherein the natural distance has side values and center values, and the non-linear amplification suppresses the side values and amplifies the center values.

3. A detector for detecting distributed denial-of-service attacks, the system comprising: a computer processor configured to determine a spectral density of packet timing intervals, a natural distance between the spectral density and a uniform distribution, and a non-linear amplifier configured to apply a non-linear amplification to the natural distance to detect a denial-of-service attack.

4. The detector of claim 3, wherein said processor is configured to determine a Kullback-Leibler distance between the spectral density and the uniform distribution.

5. The detector of claim 3, wherein said processor is configured to determine that a denial-of-service attack is detected if the non-linear amplification of the natural distance is above a threshold.

6. The method of claim 1, wherein said step of determining a natural distance comprises determining a Kullback-Leibler distance between the spectral density and the uniform distribution.

7. The method of claim 1, further comprising determining that a denial-of-service attack is detected if the non-linear amplification of the natural distance is above a threshold.

* * * * *